US010176259B1

(12) United States Patent
Cohen et al.

(10) Patent No.: US 10,176,259 B1
(45) Date of Patent: Jan. 8, 2019

(54) USE OF VIRTUAL DATABASE TECHNOLOGY FOR INTERNET SEARCH AND DATA INTEGRATION

(71) Applicants: Donald Newton Cohen, Los Angeles, CA (US); Krishnamurthy Narayanaswamy, Los Angeles, CA (US)

(72) Inventors: Donald Newton Cohen, Los Angeles, CA (US); Krishnamurthy Narayanaswamy, Los Angeles, CA (US)

( * ) Notice: Subject to any disclaimer, the term of this patent is extended or adjusted under 35 U.S.C. 154(b) by 878 days.

(21) Appl. No.: 14/519,625

(22) Filed: Oct. 21, 2014

Related U.S. Application Data

(63) Continuation of application No. 12/778,051, filed on May 11, 2010, now abandoned.

(60) Provisional application No. 61/216,273, filed on May 15, 2009.

(51) Int. Cl.
*G06F 17/30* (2006.01)

(52) U.S. Cl.
CPC .. *G06F 17/30864* (2013.01); *G06F 17/30525* (2013.01); *G06F 17/30545* (2013.01)

(58) Field of Classification Search
CPC ......... G06F 17/30566; G06F 17/30864; G06F 17/30525; G06F 17/3054
See application file for complete search history.

(56) References Cited

U.S. PATENT DOCUMENTS

| 2004/0215608 | A1* | 10/2004 | Gourlay | G06F 17/30864 |
| 2004/0260658 | A1* | 12/2004 | Dettinger | G06Q 30/0283 |
| | | | | 705/400 |
| 2006/0224578 | A1* | 10/2006 | Kadatch | G06F 17/30902 |
| 2007/0112853 | A1* | 5/2007 | Dettinger | G06N 5/025 |
| 2009/0094230 | A1* | 4/2009 | Sakata | H04N 7/17318 |
| 2010/0042610 | A1* | 2/2010 | Lakhani | G06F 17/30699 |
| | | | | 707/708 |
| 2010/0063878 | A1* | 3/2010 | Bachet | G06Q 30/0251 |
| | | | | 705/14.49 |
| 2010/0100543 | A1* | 4/2010 | Brady | G06F 17/30613 |
| | | | | 707/732 |

* cited by examiner

*Primary Examiner* — Shew Fen Lin
(74) *Attorney, Agent, or Firm* — David A. Belasco; Belasco Jacobs & Townsley, LLP

(57) ABSTRACT

This invention discloses how Virtual Database Technology can be used to make disparate data appear to be (or act as) the sort of uniform data one expects to find within a single relational database. In particular, we show how to process queries similar to those one might use in a database, even though the underlying data may be missing some of the capabilities that are required by normal databases. Whereas traditional databases require that all the tuples in a table be stored, our approach allows queries over tables where the tuples are generated as required from the data sources, and may not be stored anywhere. We show how such facilities can be used as a new foundation for Internet search.

33 Claims, 8 Drawing Sheets

```
(defrelation amtrak-sched :derivation individual-derived
  :documentation
  "(amtrak-sched fromstation fromtime tostation totime day month year cost)
   means that ..."
  :arity 8
  :types
  (string#fromstation string#fromtime string#tostation string#totime
   integer#day integer#month integer#year number#cost)
  :nonatomic t
  :type-enforcements (:none :none :none :none :none :none :none :none)
  :size ((input output input output input input input output) 9)
  :tester
  (lambda (&rest ignore) (declare (ignore ignore))
    '(lambda (rel fromcity fromtime tocity totime day month year cost)
       (declare (ignore rel))
       (and (integerp year)(integerp month)(integerp day) (numberp cost)
            (stringp fromcity)(stringp tocity)(stringp fromtime)
            (stringp totime)
            (loop for (fromt tot c) s.t.
                  (amtrak-sched fromcity fromt tocity tot day month year c)
                  thereis (and (equal fromt fromtime)
                               (equal tot totime)
                               (= c cost))))))
  :generator
  ((simplemultiplegenerator
    (fromcity output tocity output day month year output)
    (and (stringp fromcity)(stringp tocity) (integerp day)
         (integerp month)(integerp year)
         (ignore-errors (get-amtrak-cached
                          (find-amtrak-station fromcity)
                          (find-amtrak-station tocity) year month day)))
    1e6)))
```

Figure 5

Display Pretty-Printed Query

Amtrak train to Las Vegas for a Show ((DEPARTUREDATE DEPARTS ARRIVEDATE ARRIVES TRAINCOST DURATION YEAR MONTH DAY
 SHOW ARRIVALTIME NAME CCOST LOCATION TCOST)
S.T.
(AND
 (AMTRAK-SCHEDULE "LAX" "LVS" DEPARTUREDATE DEPARTS ARRIVEDATE ARRIVES
  TRAINCOST DURATION)
 (PARSE3INTS DEPARTUREDATE YEAR MONTH DAY) (SHOW-CATEGORY SHOW "Comedy")
 (> 18 ARRIVALTIME) (> ARRIVALTIME 12) (SHOW-DATE SHOW YEAR MONTH DAY)
 (SHOW-NAME SHOW NAME) (SHOW-PRICE SHOW CCOST) (SHOW-LOCATION SHOW LOCATION)
 (+ CCOST TRAINCOST TCOST) (PARSE2INTS ARRIVES ARRIVALTIME $)))

Figure 6

Combo Search Results

| DEPARTUREDATE | DEPARTS | ARRIVEDATE | ARRIVES | TRAINCOST | DURATION | YEAR | MONTH | DAY | SHOW | ARRIVALTIME | NAME | COST | LOCATION |
|---|---|---|---|---|---|---|---|---|---|---|---|---|---|
| 2010-06-11 | 10:30 | 2010-06-11 | 16:20 | 50.0 | 5:50 | 2010 | 6 | 11 | 1586 | 16 | Ron White | 80.5 | Mirage |
| 2010-06-12 | 10:30 | 2010-06-12 | 16:20 | 50.0 | 5:50 | 2010 | 6 | 12 | 1586 | 16 | Ron White | 80.5 | Mirage |
| 2010-04-16 | 10:30 | 2010-04-16 | 16:20 | 50.0 | 5:50 | 2010 | 4 | 16 | 1119 | 16 | Ray Romano and Kevin James | 124.5 | Mirage |
| 2010-04-17 | 10:30 | 2010-04-17 | 16:20 | 50.0 | 5:50 | 2010 | 4 | 17 | 1119 | 16 | Ray Romano and Kevin James | 124.5 | Mirage |
| 2010-05-21 | 10:30 | 2010-05-21 | 16:20 | 50.0 | 5:50 | 2010 | 5 | 21 | 1586 | 16 | Cheech & Chong | 45.0 | Palms |
| 2010-05-22 | 10:30 | 2010-05-22 | 16:20 | 50.0 | 5:50 | 2010 | 5 | 22 | 1586 | 16 | Cheech & Chong | 45.0 | Palms |
| 2010-04-12 | 10:30 | 2010-04-12 | 16:20 | 50.0 | 5:50 | 2010 | 4 | 12 | 92 | 16 | Dr. Scott Lewis Outrageous Comedy Hypnotist | 25.25 | Riviera |
| 2010-04-19 | 10:30 | 2010-04-19 | 16:20 | 50.0 | 5:50 | 2010 | 4 | 19 | 92 | 16 | Dr. Scott Lewis Outrageous | 25.25 | Riviera |

USE OF VIRTUAL DATABASE TECHNOLOGY FOR INTERNET SEARCH AND DATA INTEGRATION

CROSS REFERENCE TO RELATED APPLICATIONS

This Application is a Continuation of U.S. Non-Provisional patent application Ser. No. 12/778,051, filed May 11, 2010, which claims the benefit of U.S. Provisional Patent Application Ser. No. 61/216,273, filed May 15, 2009. The entire specification, claims and drawings of U.S. patent application Ser. Nos. 12/778,051 and 61/216,273 are hereby incorporated herein by reference.

BACKGROUND OF THE INVENTION

(1) Field of the Invention

The present invention relates to the field of search engines and more specifically to virtual database technology used to execute queries involving multiple databases.

(2) Description of the Related Art

Internet users today have access to a large amount of useful data but there is no effective way to combine the data from different sources. For instance, if you wanted to attend a college football game of your alma mater on the other side of the country, you might find a schedule on the web. However, in order to decide which game is easiest or cheapest to attend, you would have to copy the dates and locations of the games into travel sites in order to see how much it would cost to get to the locations of the games on the dates when they were to be played. If all of this data were in a common database, this activity could be automated as part of the process of answering a single database query involving multiple sets of data. In the example above the query would involve a "join" of the football schedule data and airline data. In relational databases, a join operation matches records in two tables. The two tables must be joined by at least one common field.

Web pages are not the only source of useful data. The same argument applies to files and documents that reside on a local computer, e.g., spreadsheets, and even such real time data as network usage or load average statistics. Other network services such as RSS, Chat and Twitter could also provide data that one might wish to be able to combine with other data in a single search query.

The commercial databases available today are certainly capable of representing and storing all of the data above, but that data is simply not available in a form where this option is feasible to implement. In the example above, the airlines almost certainly do have a database containing all of the available flights, but they do not make that data available as a single table. Rather, they provide a web site that requires a user to supply a point of departure, a destination, and a date before responding with a list of flights relevant to that specific query.

Unfortunately, the dominant database technology available today, Relational Databases (RDB) cannot make use of data in this form. RDBs expect to deal with complete tables containing ALL of the data of interest at once.

It would be possible to find a list of all airports and then send queries to all airlines asking about flights from every airport to every other airport on every day for the next six months (or however far in advance they schedule flights). Indeed, U.S. Pat. No. 5,826,258 is a related patent to this application that teaches this kind of method to generate all the tuples of relations in a virtual database. However, schedules change from day to day, and price and availability data change even more often. An airline might not mind a single user or search engine sending a huge number of queries every few months, but they would certainly not want to deal with such a large number of queries every hour or so.

We describe below an alternative way to use the data that is available in order to answer the same sorts of queries that one might make of a relational database. This method ends up using the data in a way more like the way humans use it. In the example with the football games, the human user did not need a complete airline schedule. He only needed to look up flights from where he lives to the cities where his football team was going to play, and only for the dates on which the team was to play in those cities.

While RDBs impose requirements on data that are unrealistic for much of the data available to computer users today, there is another technology, which we refer to as Virtual Database (VDB) technology, that turns out to be much better for the purpose at hand. This can be viewed as a generalization of RDB technology. The data of interest is represented in "relations", where we can define a relation as a set of sequences of objects, where every sequence in the set has the same (predetermined) length. These relations are more like the predicates of first order logic than the tables of RDBs. From a computational point of view, there are a number of different operations that might or might not be supported by a particular implementation of such a relation. Most of these operations are assumed (and required) to be supported by RDBs, e.g., there must be a way to add a sequence (row) to an RDB table and there must be a way to generate all of the sequences (rows) of a relation (table). These operations are generally optional In VDB technology. A VDB query optimizer can still be built, but unlike an RDB query optimizer, there are queries that cannot be answered. That is, no algorithm exists to answer them. Nevertheless, in many practical cases, such as the football example, it is possible to find algorithms, and even efficient ones.

It is worth mentioning that many things people view as computations rather than "data" also make sense as VDB relations. For instance, the "plus" relation can be viewed as the set of triples, x, y, z, such that x+y=z. Although there is no way to generate all such triples, there are methods for generating them, i.e. for any given input values x and z, all values for y such that x+y=z. To describe the plus relation one would provide three such algorithms, each generating one column given values for the other two. In addition one could provide a testing operation, but this could be easily deduced from any of the three generating operations. The plus relation never changes, so there would be no operations for adding or removing sequences from the set.

Another way of viewing the football problem is that the airline schedule is a function which takes as input two airports and a date, and returns a set of flights along with times and costs. This function is then to be applied to the results of another function which computes (from no inputs) a set of times and places where a certain football team is to play.

An existing implementation of a VDB may be found at http://www.ap5.com. This is a web site where the user manual for the VDB system is published. Unfortunately, these contents are not available in any other publication. http://www.ap5.com provides all the information necessary to use the VDB implementation, including how to define relations, how to annotate relations, how to specify new relation representations including computed relations. The innovations underlying the Ap5 System have also been described in detail in the following papers: Compiling Complex Database Transition Triggers, Donald Cohen, ACM SIGMOD Conference 1989.; Automatic Compilation of Logical Specifications into Efficient Programs, Donald Cohen, American Association of Artificial Intelligence (AAAI) Conference, 1986.; and Software Evolution Through Iterative Prototyping, K. Narayanaswamy & Neil Goldman, International Conference on Software Engineering (ICSE), 1992. Both Donald Cohen articles provide details about how queries written in the language of Ap5 can be compiled into efficient run-time code. The system described in http://www.ap5.com was also extended to provide event correlation primitives in a related US Patent referenced in U.S. Pat. No. 6,629,106 B1.

Development of a method of querying multiple databases which can answer questions using data from all databases represents a great improvement in the field of search engines and satisfies a long felt need of the public.

SUMMARY OF THE INVENTION

The present invention is a method of querying multiple databases which can answer questions using data from all databases.

VDB abstracts the notion of a relation by allowing programmers to provide computations that can be used to generate and to test the relation. Note that VDB does not require that the relation be fully generable. So, the methods specified do not have to generate all the tuples of a relation. The present invention uses this flexibility to view arbitrary data sources on the Internet to be viewed as VDB relations by providing code to generate the relation or test the relation. Any data source from which one can extract tabular data (even partially) in an automatic way can be viewed as a VDB relation.

In the conception of VDB Ap5, while computations could be viewed as relations, the computations were assumed to be performed entirely inside the VDB process, using only data internal to that process. This invention covers the extension of VDB technology to computations that communicate with other, external data sources, such as web servers, in order to treat the external data that can be retrieved (or one might as well say "computed") from those sources as relations. In essence, we will take programs that retrieve or compute data from web sites, possibly requiring input in order to do so, and view those programs as the way to partially generate relations. The inputs and outputs are all columns in the same relation. In some cases there may be different programs that compute different partial results for the same relation, similar to the different programs that compute the different columns of the plus relation.

While VDB technology supports transactional semantics similar to those of traditional RDBs, it can also be used in applications where transactional semantics do not apply. Specifically, in the universe of diverse data sources (such as web pages) over the Internet, there is no control over updates to external data, and no guarantee that the data retrieved from different sites are valid at a later time. And yet the computation involving looking up flights, as described above, could still be very useful in practice.

For example, if we want to specify an airline schedule that is available through a Web form at a particular URL, we could view this data as a table containing columns such as the StartingCity, Destination, Date, TimeOfDeparture, TimeOfArrival, Cost and so on. This table is not fully generable, but the form provides a method to generate the rows of the table given specific values for the StartingCity, Destination, and Date. Once many different data sources are defined as a set of VDB relations, the present invention allows an Internet search over these data using the VDB query language. Traditional Internet search, as exemplified by Google®, Bing®, and Yahoo! ®, use keyword search to list results as a list of URLs. Users must then go through the URLs themselves to understand the contents of the results. If users need to make decisions by comparing values from different URLs or need to perform even the simplest of calculations, the task must be performed manually, and, therefore, becomes tedious and error-prone. In contrast, the present invention allows the full power of first order logic queries to be used to correlate information from different data sources and to perform calculations for the user. Results are presented in the form of a table, which many Internet users find intuitive and convenient to understand and to use.

Furthermore, because queries are complex for typical Internet users to define, the present invention views search queries as reusable objects that can themselves be represented as URLs and indexed by keywords in standard search engines. A reusable search can be restricted to just the required user inputs, thereby making the query as flexible as possible for end users, who can apply the search to their own inputs without understanding how to define the logic of the query. Typical Internet users would locate the reusable searches by providing input keywords (as they currently expect to when they interact with any search engine).

An appreciation of the other aims and objectives of the present invention and an understanding of it may be achieved by referring to the accompanying drawings and description of a preferred embodiment.

BRIEF DESCRIPTION OF THE DRAWINGS

FIG. 5 a sample of a metadata specification.
FIG. 6 shows a sample search query.
FIG. 7 shows sample result table.
FIG. 8 shows a sample reusable search query.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
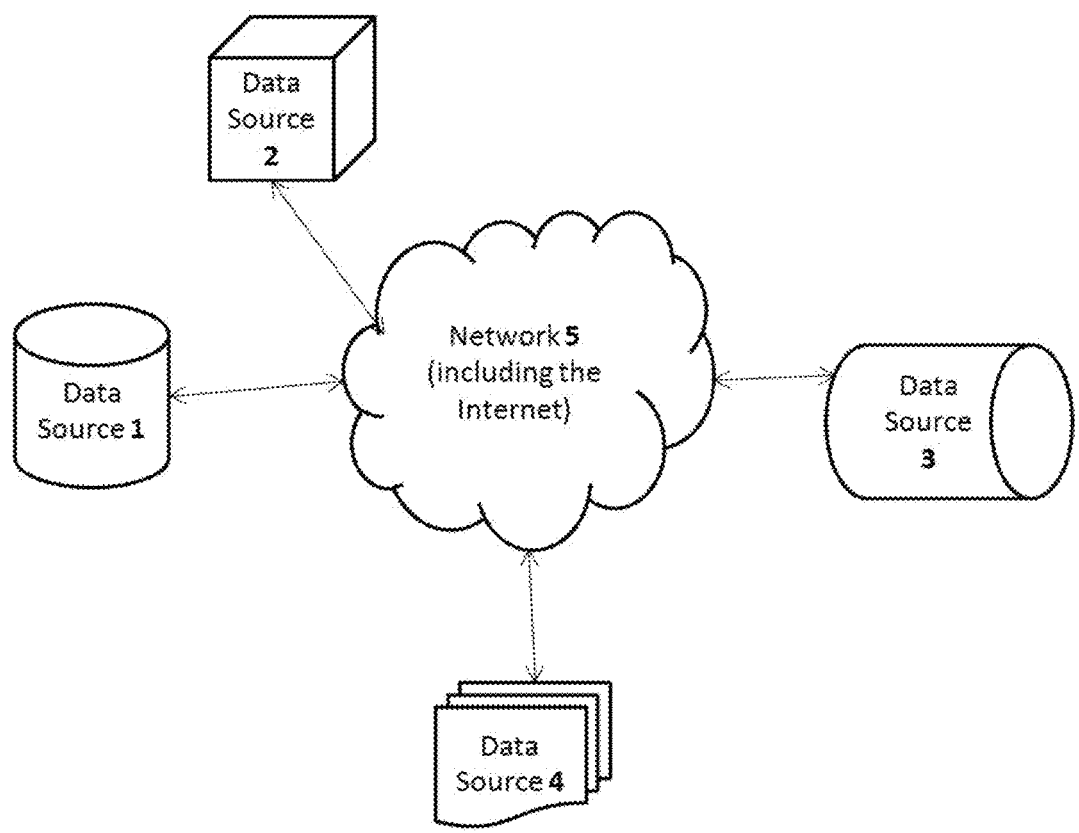
FIG. 1 shows a diagram of multiple heterogeneous data sources.

FIG. 1 shows a diagram of multiple heterogeneous data sources 1, 2, 3 and 4 operating over a network 5.

The current state of the art to access data from any of the sources 1, 2, 3, or 4 includes methods for automating such processes as one that simulates a user entering two cities and a date into an airline site and retrieving data on flights from the result. Of course, there are many other possible sources of data, including foreign RDBs, data files (whether found on the Internet or the local machine), etc. Our main innovation in the present invention is the idea of treating these computations as relations (or as ways to partially generate relations) in a VDB. Once a number of such diverse data sources (such as data sources 1, 2, 3, and 4) are so represented as relations, it is possible to implement new search services over this data using the VDB's query language.

When users have specific search questions that involve information from multiple data sources (such as web pages), such search facilities will prove to be far superior to keyword-based searches such as those provided by Google® or Bing®. This is because the new search algorithms exploit the underlying relational structure and semantics of relations by using the power of a query language to integrate data from different sources.

In the examples below we use the Ap5 language (http://www.ap5.com), which is an extension of the Common Lisp programming language, and uses the same syntax as Common Lisp. The examples should be comprehensible to anyone with a programming background. Suppose we have implemented the function in a Common Lisp program:

get-amtrak-cached (from to year month day)

where, from and to are strings corresponding to train station codes (or names) and year, month and day are numbers encoding a date, which accesses the Amtrak web site and returns a list of entries of form (departure, arrival and cost), where departure and arrival are time strings, such as "22:35" and cost is a number of dollars. (The term "cached" indicates that this particular function saves the results retrieved from the web site and reuses them without accessing the web site again (if they are not considered too old.)

That function could be used to define the following VDB relation:

(amtrak-sched fromstation fromtime tostation totime day month year cost)

as described in FIG. 5.

For a complete understanding of this example the reader is referred to http://www.ap5.com. Ap5 is a comprehensive programming system (essentially an instance of a generic embodiment of the virtual database concept). It is not published in the same sense as a paper or monograph on this or that subject. The following papers: Compiling Complex Database Transition Triggers, Donald Cohen, ACM SIGMOD Conference 1989.; Automatic Compilation of Logical Specifications into Efficient Programs, Donald Cohen, American Association of Artificial Intelligence (AAAI) Conference, 1986.; and Software Evolution Through Iterative Prototyping, K. Narayanaswamy & Neil Goldman, International Conference on Software Engineering (ICSE), 1992 do explain how Ap5 works etc. from a traditional publication perspective. We describe here only a few general features.

:nonatomic t means that this relation does not support transactional semantics. "Transactional Processing" is type of computer processing in which the computer responds immediately to user requests. Each request is considered to be a transaction. Automatic teller machines for banks are an example of transaction processing. In computer science, "semantics" is frequently used to differentiate the meaning of an instruction from its format. This is related to :type-enforcements (:none:none:none:none:none:none:none:none)

which means that the types specified by

:types (string#fromstation string#fromtime . . . )

are not to be enforced. Enforcing them would require transactional semantics:

size ((input output input output input input input output) 9)

means that we estimate that the function will, on average, return 9 outputs for a given set of inputs. The inputs correspond to the arguments of the function and the outputs to the results. This is used for query optimization. Similarly, the number "1e6" at the end of the example is an estimate (one million, in floating point scientific notation) of the time required to call this function. The units are really only relative, but the simple computations tend to have estimates on the order of 1, so this means that calling the function is much more time consuming than simple computations.

:generator ((simplemultiplegenerator . . . ))

describes how the function is used to generate time and price data from station and date inputs.

Figure 2:
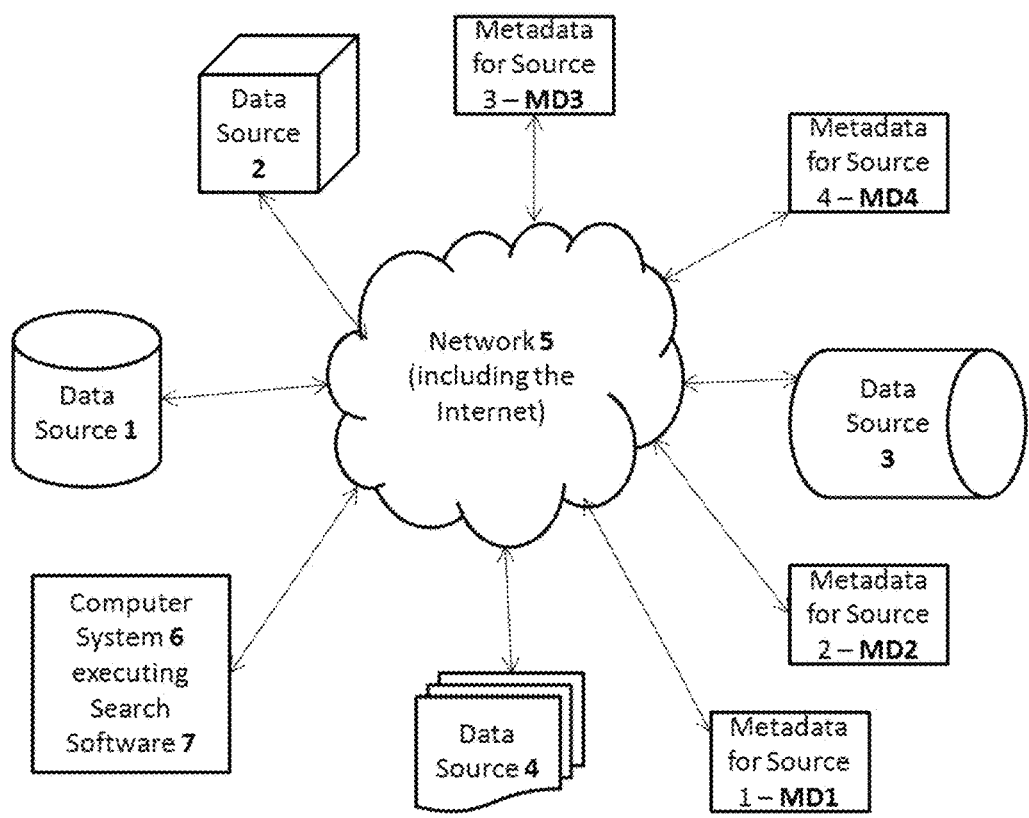
FIG. 2 shows an example of multiple, heterogeneous data sources.

We refer to the descriptions of a data source as relations as a VDB Metadata Specification for that source. FIG. 2 shows an example of multiple, heterogeneous data sources 1, 2, 3, and 4 described by separate metadata artifacts MD1, MD2, MD3, and MD4 respectively. FIG. 2 also shows a computer system 6 used to execute an embodiment of the present invention 7. All of these components operate over the network 5.

It is important to note that the locations of the VDB Metadata Specifications MD1, MD2, MD3, and MD4 do NOT have to be the same as the location of the data for data sources 1, 2, 3, and 4 respectively. This point is of great significance because we do not want to wait for data providers to change their web pages in order to be able to access their data.

In fact, it is possible to post metadata specifications MD1, MD2, MD3, and MD4 on the Internet in order to share them with others. When one person creates metadata for a web site, and makes it available on a public web page, it becomes possible for everyone, everywhere to treat the data at that site in a relational manner using the VDB technology (for example, when users search for "Amtrak Metadata" or "Inflation Metadata"). For that matter, there is no reason that there cannot be more than one relational view of the same data, possibly created by different people at different times and residing in the same virtual database.

Figure 3:
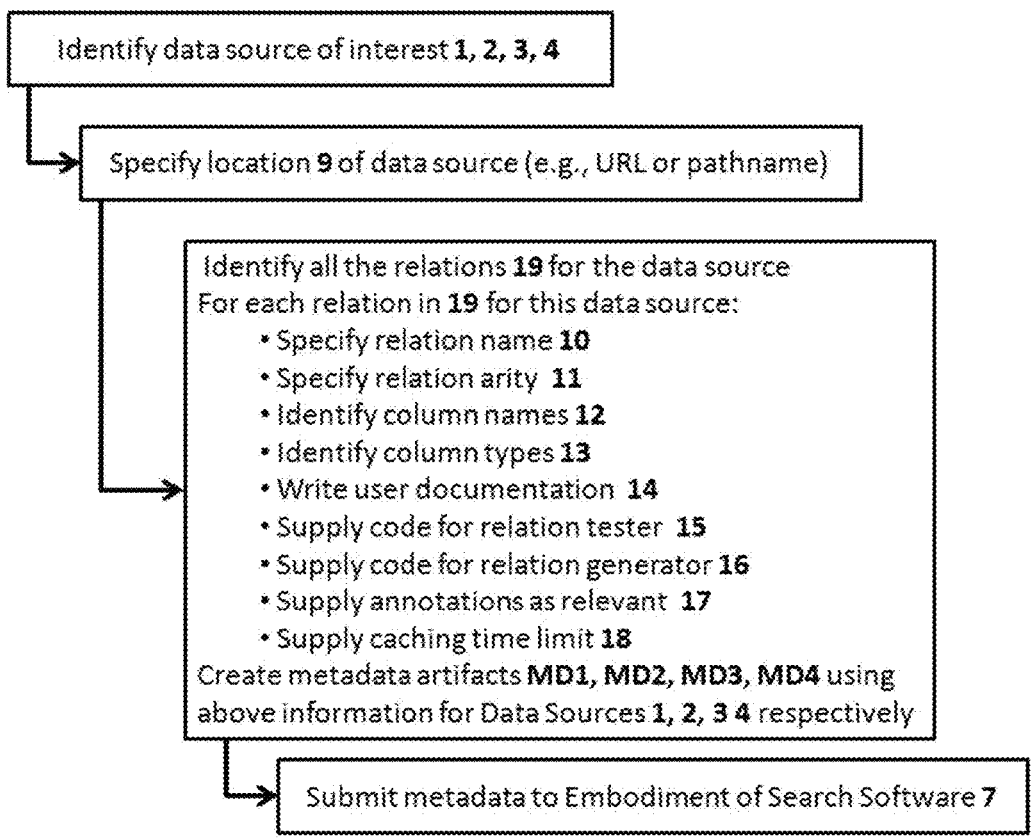
FIG. 3 shows a flowchart for the process of creating metadata artifacts.

FIG. 3 shows a flowchart for the process of creating metadata artifacts MD1, MD2, MD3 and MD4 for data sources 1, 2, 3, and 4. Specifying the metadata for relations entails: specification of the location 9 of the data source; and the following components of a metadata specification: Specify relation name 10; Specify number of relation columns (relation arity) 11; Identify column names 12; Identify column types 13; Write user documentation 14; Supply code for relation tester 15; Supply code for relation generator 16; Supply annotations as relevant 17; and Supply caching time limit 18.

All the elements described in FIG. 3 are assembled into a single metadata specification for the relation. FIG. 5—a sample of a metadata specification MD1 submitted to an embodiment of the present invention 7 over the network 5. Once the metadata specification, such as MD1, is processed by the embodiment of the present invention 7, one could enter a query such as follows:

(listof (x y z) s.t. (amtrak-sched "LAX".times."LVS" y day month year z))

to find results similar to calling the function (get-amtrak-cached "LAX" "LVS" year month day)

However, many other queries would also be possible. For instance, if we had other relations describing shows in Las Vegas, such as (show-category show category)
(show-time show year month day start end)
(show-price show price)

where show is the name of the show, and category is a category such as "comedy", then with the help of a few easily defined computational relations we could construct a large number of useful queries, such as (listof (depart arrive day mon year tcost show scost start end cost) s. t.
(and (amtrak-sched "LAX" depart "LVS" arrive day mon year tcost)
(show-category show "comedy")
(show-price show scost)
(show-time show year month day start end) (time>start arrive) (+scost tcost cost)))

which finds comedy shows and trains from Los Angeles to Las Vegas on the same days as the shows, where the train arrives before the shows start, along with the cost of the show, the train and the sum of the two. It would be easy to add another condition to eliminate results with total cost over $100 or to require that the show start at least 2 hours later than the train arrives, or at most 4 hours later, etc.

Figure 4:
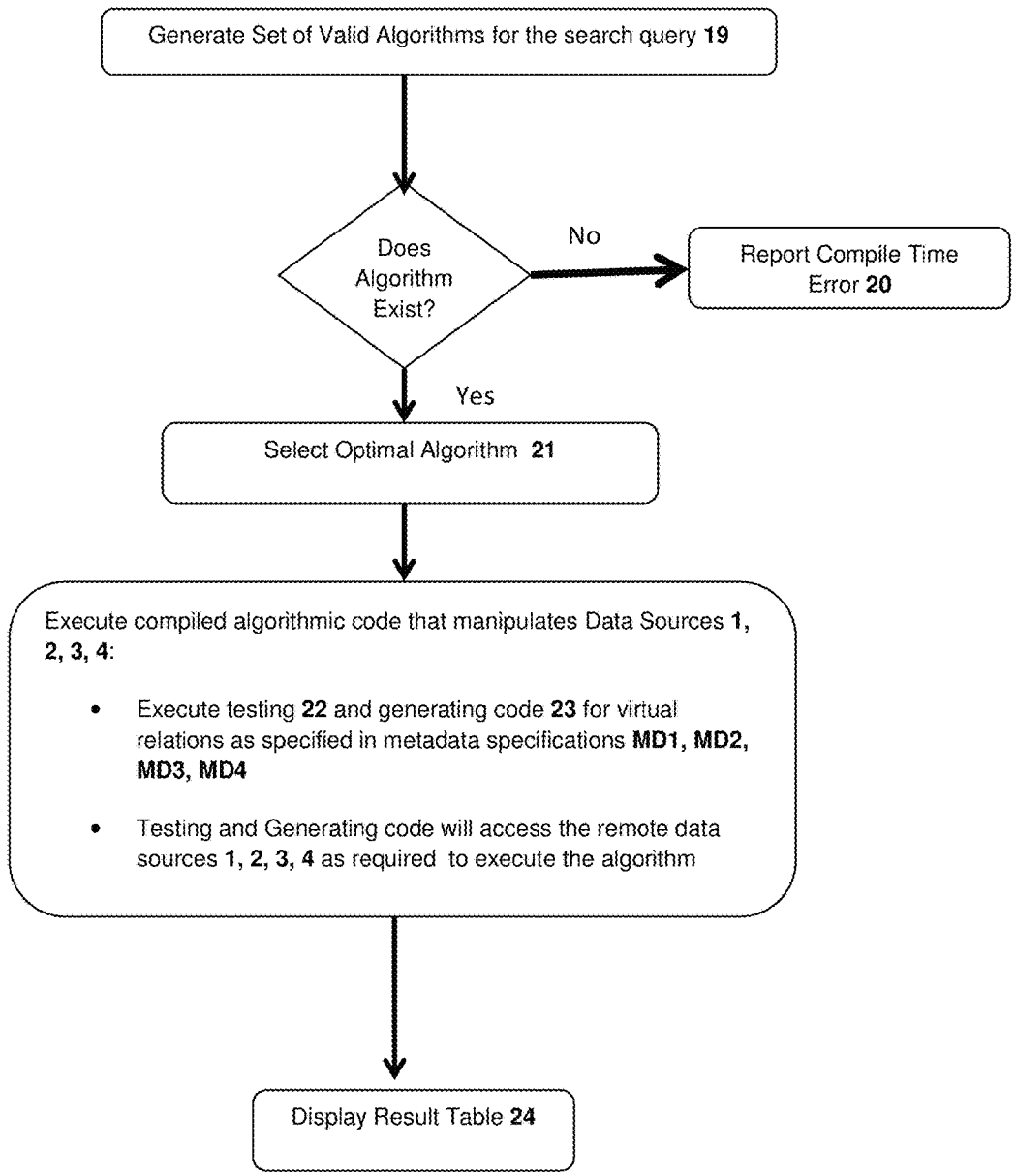
FIG. 4 shows a flowchart for what an embodiment of the present invention.

FIG. 4 shows a flowchart for what an embodiment of the present invention 7 would do with a search query 19. If no algorithm is found for the search query 19, a compile time error 20 is reported. If one or more algorithms are found, the optimal algorithm 21 is selected and executed. Execution of the optimal algorithm 21 results in the execution of the testing code 22 and/or the generating code 23 for various virtual relations. At the end of successful execution, a results table 24 is displayed.

Once the information from external data sources is described using the VDB framework, one can view many complex search problems as queries over the relations defined in the VDB. The queries so defined provide the ability to integrate data from a diversity of data sources using the single common denomination of relations. FIG. 6 shows a sample search query 19 issued to an embodiment of the present invention 7.

FIG. 7 shows sample result table 24 displayed by an embodiment of the present invention 7 if compiling a sample search query 19 results in an optimal algorithm 21 is successfully executed.

This capability can be used to build innovative new Internet search services and various kinds of data integration applications over heterogeneous data sources. Although any user can utilize this kind of search, one practical challenge is that typical Internet users will lack the knowledge and patience to define queries in the VDB query language. To aid adoption with typical Internet users, we provide methods for users to use queries created by others, and to customize the search queries that others have defined.

Search queries, such as the query shown in FIG. 6, provide search results that are far more useful to end users. However, such search queries would also be much more complicated for users to define. Currently, Internet users are accustomed to getting search results by entering no more input than a set of keywords.

To make it easier for average Internet users to use the described search capabilities, the knowledgeable individuals define and save queries, and organize them in a fashion that allows other Internet users to find the search queries in different situations, Average users are allowed to reuse existing query templates, either using them as designed or tailoring them (e.g., by providing inputs) to their own specific requirements.

Reusable searches are also created as separate web pages visible to the public. Making these pages public makes them accessible to search engines such as Google®, Yahoo! ®, and Bing®. A reusable search page presents the user with the following: A simple form to allow users to provide all required inputs for the search; an explanation of what the search does; including the output table that can be obtained by initiating the search; a button to initiate the search; and a button to customize the search.

Figure 8:
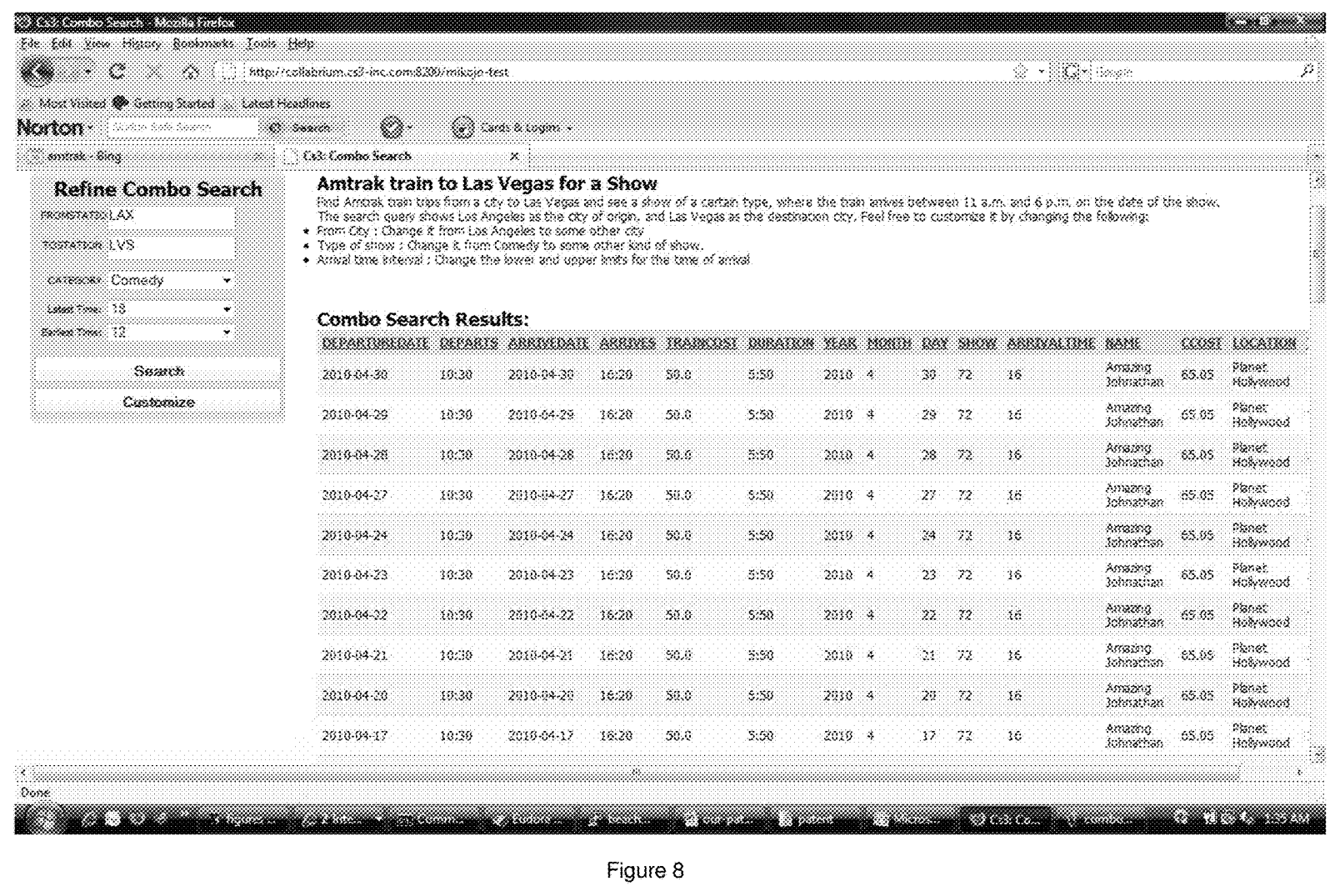

All the other logical details of the query are hidden from the user (unless the user chooses to customize the search). FIG. 8 shows a sample reusable search query 19 restricted to just required inputs in order to simplify use of the query for typical Internet consumers. Search results 19 are displayed if users supply the required inputs and click Search.

The user can also choose to customize a reusable search. In this case, the user will see the search query in its entirety, including all the logical clauses of the query and all the required user inputs. The user can alter the logical clauses of the search query and change the set of inputs if desired. In effect, the user is supported through a graphical user interface (GUI) in using the reusable search as a template to create a new search query.

The search facilities described herein require retrieval of data from all the relevant data sources in real-time over the Internet in order to answer queries. This will invariably present performance challenges, relative to present-day search engines that focus on keyword indexing data that is invariably stored on a single machine.

One strategy to improve the performance of the search queries is to cache data from different data sources. For example, if a user retrieves the airline schedule for Acme Airlines for a given date travelling from City A to City B, that data can be cached so that subsequent queries that need to compute the schedule from City A to City B for the same date can be executed much faster. The key issue with data caches in this application is for the query optimizer to know when the data cache can be used and when it is required that the data be generated anew by accessing the data source over the network. Caching policies are part of the metadata specification for each data source. In particular, we allow metadata specifications to indicate the maximum length of time that data can remain in the cache and still be valid. For airline schedules, the schedule data may be good till midnight of that day, when new schedule data is loaded into the database. For certain census data, the data in the cache may be good for years. This really depends on the nature of the data in the data source, and metadata specifications are used to describe the caching policy for the data source.

The following reference numerals are used on FIGS. 1 through 8:

1 data source 1
2 data source 2
3 data source 3
4 data source 4
5 network
MD1 metadata artifact 1
MD2 metadata artifact 2
MD3 metadata artifact 3
MD4 metadata artifact 4
6 computer system
7 present invention
9 location of the data source
10 relation name 11 relation arity (number of relation columns)
12 column names
13 column types
14 user documentation
15 code for relation tester
16 code for relation generator
17 annotation
18 caching time limit 18

Thus, the present invention has been described herein with reference to particular embodiments for a particular application. Those having ordinary skill in the art and access to the present teachings will recognize additional modifications, applications and embodiments within the scope thereof. It is therefore intended by the appended claims to cover any and all such applications, modifications and embodiments within the scope of the present invention.

What is claimed is:

1. A method to integrate data from diverse sources comprising the steps of:
   a) identifying a first data source of interest, said first data source comprising a database, said first data source having a first location; said first data source including first data; said first data including a first relation name, a first relation arity, a first column name, a first value and a first column type;
   b) creating a first metadata artifact for said first data source including said first relation, said first relation arity, said first column name, said first value and said first column type;
   c) said first metadata artifact supplying a first tuple testing means for testing whether a tuple matching said first relation name, said first column name and said first value exists in said first data using said first metadata artifact;
   d) said first metadata artifact supplying a first relation generating means for generating all tuples matching said first relation name, said first column name and said first value using said first metadata artifact;
   e) using said first metadata artifact to access said first data;
   f) applying said first tuple testing means of said first metadata artifact and storing first returns in said first metadata artifact;
   g) applying said first relation generating means of said first metadata artifact and storing second returns in said first metadata artifact;
   h) supplying a first caching time limit for each relation name in said first metadata artifact and storing said first caching time limit in said first metadata artifact;
   i) identifying a second data source of interest, said second data source comprising a website, said second data source having a second location; said second data source including second data; said second data including a second relation name, a second relation arity, a second column name, a second value and a second column type;
   j) creating a second metadata artifact for said second data source including said second relation name, said second relationship arity, said second column name, said second value and said second column type;
   k) said second metadata artifact supplying a second tuple testing means for testing whether a tuple matching said second relation name, said second column name and said second value exists in said second data using said second metadata artifact;
   l) said second metadata artifact supplying a second relation generating means for generating all tuples matching said second relation name, said second column name and said second value using said second metadata artifact;
   m) using said second metadata artifact to access said second data;
   n) applying said second tuple testing means of said second metadata artifact and storing third returns in said second metadata artifact;
   o) applying said second relation generating means of said second metadata artifact and storing fourth returns in said second metadata artifact;
   p) supplying a second caching time limit for each relation name in said second metadata artifact and storing said second caching time limit in said second metadata artifact;
   q) identifying a third data source of interest, said third data source comprising a document, said third data source having a third location; said third data source including third data; said third data including a third relation name, a third relation arity, a third column name, a third value and a third column type;
   r) creating a third metadata artifact for said third data source including said third relation name, said third relationship arity, said third column name, said third value and said third column type;
   s) said third metadata artifact supplying a third tuple testing means for testing whether a tuple matching said third relation name, said third column name and said third value exists in said third data using said third metadata artifact;
   t) said third metadata artifact supplying a third relation generating means for generating all tuples matching said third relation name, said third column name and said third value using said third metadata artifact;
   u) using said third metadata artifact to access said third data;
   v) applying said third tuple testing means of said third metadata artifact and storing fifth returns in said third metadata artifact;
   w) applying said third relation generating means of said third metadata artifact and storing sixth returns in said third metadata artifact;
   x) supplying a third caching time limit for each relation name in said third metadata artifact and storing said third caching time limit in said third metadata artifact;
   y) identifying a fourth data source of interest, said fourth data source comprising a computation, said fourth data source having a fourth location; said fourth data source including fourth data; said fourth data including a fourth relation name, a fourth relation arity, a fourth column name, a fourth value and a fourth column type;
   z) creating a fourth metadata artifact for said fourth data source including said fourth relation name, said fourth relationship arity, said fourth column name, said fourth value and said fourth column type;
   aa) said fourth metadata artifact supplying a fourth tuple testing means for testing whether a tuple matching said fourth relation name, said fourth column name and said fourth value exists in said fourth data using said fourth metadata artifact;
   bb) said fourth metadata artifact supplying a fourth relation generating means for generating all tuples matching said fourth relation name, said fourth column name and said fourth value using said fourth metadata artifact;
   cc) using said fourth metadata artifact to access said fourth data;

dd) applying said fourth tuple testing means of said fourth metadata artifact and storing seventh returns in said fourth metadata artifact;
ee) applying said fourth relation generating means of said fourth metadata artifact and storing eighth returns in said fourth metadata artifact;
ff) supplying a fourth caching time limit for each relation name in said fourth metadata artifact and storing said fourth caching time limit in said fourth metadata artifact;
gg) posing a logical search query for correlating said first value for said first column name in said first relation with said second value for said second column name in said second relation, said third value for said third column name in said third relation and said fourth value for said fourth column name in said fourth relation;
hh) generating a set of algorithms for said logical search query; said set of algorithms exploit the underlying relational structure and semantics of relations by using the power of a query language to integrate data from different sources and comprising one or more valid algorithms and one or more invalid algorithms; said one or more valid algorithms generate a set of tuples when applying each of said one or more valid algorithms; each of said one or more invalid algorithms fails to generate a set of tuples for said logical search query;
ii) for said one or more invalid algorithms reporting a compile time error; and
jj) selecting an optimal algorithm from said one or more valid algorithms and accessing said first, second, third and fourth metadata artifacts to execute said optimal algorithm; and
kk) displaying the results of execution of said optimal algorithm in tabular form.

2. The method as claimed in claim 1 in which said first data is limited or partial data.

3. The method as claimed in claim 1 in which said second data is limited or partial data.

4. The method as claimed in claim 1 further comprising the step of supplying a first annotation for said first data source.

5. The method of claim 4 in which said first annotation comprises a number of tuples that can be expected to match said first value of said first column of said first relation.

6. The method as claimed in claim 1 further comprising the step of supplying a second annotation for said second data source.

7. The method of claim 6 in which said second annotation comprises a number of tuples that can be expected to match said second value of said second column of said second relation.

8. The method as claimed in claim 1 in which said first, second, third and fourth locations are different.

9. The method as claimed in claim 1 in which said first location is on the Internet and publically available.

10. The method as claimed in claim 1 in which said second location is on the Internet and publically available.

11. The method as claimed in claim 1 further comprising the step of providing a means to reuse said query.

12. The method as claimed in claim 11 in which said means to reuse includes;
 a. an input means for making input for said query;
 b. an explanation to describe the purpose of said query;
 c. a description of the output of said query;
 d. an executing means for executing said query; and
 e. a customizing means for customizing said query.

13. The method as claimed in claim 12 in which said input means is a first Tillable form on a web page.

14. The method as claimed in claim 12 in which said executing means is a clickable button on said web page.

15. The method as claimed in claim 12 in which said customizing means is a second form on said web page.

16. The method of claim 1 in which said first metadata artifact is indexed by an Internet search engine.

17. The method of claim 1 in which said second metadata artifact is indexed by an Internet search engine.

18. The method of claim 12 in which said explanation is indexed by an Internet search engine.

19. The method of claim 12 in which said description is indexed by an Internet search engine.

20. The method of claim 1 further comprising the step of limiting the time for which said first metadata artifact remains valid.

21. The method of claim 1 further comprising the step of limiting the time for which said second metadata artifact remains valid.

22. The method as claimed in claim 1 in which said third data is limited or partial data.

23. The method as claimed in claim 1 in which said fourth data is limited or partial data.

24. The method as claimed in claim 1 further comprising the step of supplying a third annotation for said third data source.

25. The method of claim 24 in which said third annotation comprises a number of tuples that can be expected to match said third value of said third column of said third relation.

26. The method as claimed in claim 1 further comprising the step of supplying a fourth annotation for said fourth data source.

27. The method of claim 26 in which said fourth annotation comprises a number of tuples that can be expected to match said fourth value of said fourth column of said fourth relation.

28. The method as claimed in claim 1 in which said third location is on the Internet and publically available.

29. The method as claimed in claim 1 in which said fourth location is on the Internet and publically available.

30. The method of claim 1 in which said third metadata artifact is indexed by an Internet search engine.

31. The method of claim 1 in which said fourth metadata artifact is indexed by an Internet search engine.

32. The method of claim 1 further comprising the step of limiting the time for which said third metadata artifact remains valid.

33. The method of claim 1 further comprising the step of limiting the time for which said fourth metadata artifact remains valid.

* * * * *